US010865893B2

(12) United States Patent
Marks et al.

(10) Patent No.: US 10,865,893 B2
(45) Date of Patent: Dec. 15, 2020

(54) ROTATABLE VALUE SPOOL FOR A MANIFOLD

(71) Applicant: 3M INNOVATIVE PROPERTIES COMPANY, St. Paul, MN (US)

(72) Inventors: Nathan E. Marks, Rosemount, MN (US); Jeremy A. Schmoll, Pine Island, MN (US)

(73) Assignee: 3M Innovative Properties, Inc., St. Paul, MN (US)

( * ) Notice: Subject to any disclaimer, the term of this patent is extended or adjusted under 35 U.S.C. 154(b) by 68 days.

(21) Appl. No.: 16/075,910

(22) PCT Filed: Jan. 20, 2017

(86) PCT No.: PCT/US2017/014306
§ 371 (c)(1),
(2) Date: Aug. 6, 2018

(87) PCT Pub. No.: WO2017/139080
PCT Pub. Date: Aug. 17, 2017

(65) Prior Publication Data
US 2019/0049024 A1 Feb. 14, 2019

Related U.S. Application Data

(60) Provisional application No. 62/293,845, filed on Feb. 11, 2016.

(51) Int. Cl.
*F16K 11/076* (2006.01)
*F16K 11/085* (2006.01)
(Continued)

(52) U.S. Cl.
CPC ........ *F16K 11/076* (2013.01); *B01D 35/1573* (2013.01); *F16K 3/26* (2013.01);
(Continued)

(58) Field of Classification Search
CPC ..... Y10T 137/86566; Y10T 137/86767; F16K 11/076; F16K 11/085; F16K 3/26; F16K 27/06; B01D 35/1573
(Continued)

(56) References Cited

U.S. PATENT DOCUMENTS 3,048,191 A * 8/1962 Crang ................... F16K 5/0407
137/625.32
3,090,396 A * 5/1963 Rudelick ............. F16K 11/0856
137/375
(Continued)

FOREIGN PATENT DOCUMENTS

CN 102620010 8/2012
DE 12 39 900 5/1967
(Continued)

OTHER PUBLICATIONS

Supplementary European Search Report for EP. Appl. No. 17750553, (dated Sep. 5, 2019) 3 pages.
(Continued)

*Primary Examiner* — Kevin R Barss
(74) *Attorney, Agent, or Firm* — Scott A. Baum

(57) ABSTRACT

A rotatable valve spool for a spool valve manifold. The rotatable valve spool having a longitudinal axis along its length, a cylindrical body, a first end, and a second end. A first angled seal, a second angled seal, an optional central seal, and an outer seal each disposed on the cylindrical body with the optional central seal disposed between the first and second angled seals and the outer seal disposed between the second angled seal and the second end. A first flow port in the cylindrical body disposed outboard of the first angled seal between the first angled seal and the first end or disposed in the first end, and a second flow port disposed outboard of the second angled seal between the second angled seal and the outer seal.

19 Claims, 10 Drawing Sheets

(51) Int. Cl.
  *F16K 27/06* (2006.01)
  *F16K 3/26* (2006.01)
  *B01D 35/157* (2006.01)

(52) U.S. Cl.
  CPC .......... *F16K 11/085* (2013.01); *F16K 27/065* (2013.01); *B01D 2201/302* (2013.01); *B01D 2201/4015* (2013.01); *B01D 2201/4061* (2013.01)

(58) Field of Classification Search
  USPC .......................... 251/314, 316, 317, 317.01
  See application file for complete search history.

(56) References Cited

U.S. PATENT DOCUMENTS

| | | | | |
|---|---|---|---|---|
| 3,103,231 A | * | 9/1963 | Moen | E03C 1/023 137/454.2 |
| 3,166,097 A | | 1/1965 | Gottlob | |
| 3,280,843 A | * | 10/1966 | Rutherford | F16K 31/122 137/625.47 |
| 3,387,631 A | * | 6/1968 | Pecis | F16K 11/078 137/625.17 |
| 4,806,240 A | | 2/1989 | Giordano | |
| 5,152,321 A | | 10/1992 | Drafer | |
| 6,120,685 A | | 9/2000 | Carlson | |
| 6,254,061 B1 | * | 7/2001 | Levine | A61B 1/00135 251/322 |
| 6,758,242 B2 | * | 7/2004 | Jones | F16K 31/605 137/625.41 |
| 2002/0038668 A1 | | 4/2002 | Fritze | |
| 2004/0144710 A1 | | 7/2004 | Bassett | |
| 2006/0124182 A1 | | 6/2006 | Kim | |

FOREIGN PATENT DOCUMENTS

| | | |
|---|---|---|
| EP | 1938881 | 7/2008 |
| FR | 2 300 277 | 9/1976 |
| WO | WO 2017-044348 | 3/2017 |

OTHER PUBLICATIONS

International Search Report for PCT International Application No. PCT/US2017/014306, dated Apr. 20, 2017, 3 pages.

* cited by examiner

ROTATABLE VALUE SPOOL FOR A MANIFOLD

CROSS REFERENCE TO RELATED APPLICATIONS

This application is a national stage filing under 35 U.S.C. 371 of PCT/US2017/014306, filed Jan. 20, 2017, which claims the benefit of U.S. provisional Patent Application No. 62/293,845, filed Feb. 11, 2016, the disclosures of which are incorporated by reference in their entirety herein.

BACKGROUND

Replaceable filter cartridges are often interchangeably connected to a filter manifold that is secured to the appliance or machine requiring the filtration. In some filter manifolds used with quarter turn filter cartridges, where an approximately 90 degree revolution of the filter cartridge engages and disengages the filter cartridge from the manifold, a rotating spool within the manifold is used to turn on the liquid flow when the filter cartridge is fully installed and to turn off the liquid flow for removing the filter cartridge. Such filter cartridges and manifolds are often used in refrigerators to filter drinking water prior to dispensing it from a valve located on the door of the refrigerator.

SUMMARY

Quarter turn spool valve manifolds need to be made cost effectively and they must reliably start and stop the flow of the filtered liquid. Typically, O-rings are used as sealing members to seal to a rotatable valve spool during rotation and to seal the fluid paths internal to the manifold so as to direct the fluid into and out of the filter cartridge. However, when inlet and outlet ports for the manifold are placed perpendicular to the longitudinal axis of the rotatable valve spool, face sealing O-rings are required to isolate the inlet and outlet paths in addition to the circumferential O-rings around the upper and lower ends of the spool valve. Positioning face sealing O-rings and assembling the manifold can be cumbersome. Therefore, eliminating the face sealing O-rings and reducing the number of O-rings for reliability is beneficial.

The inventors have found that by angling two or more of the O-rings on the rotatable valve spool relative to the longitudinal axis, both of the face sealing O-rings can be eliminated improving reliability and easing assembly of the manifold.

Hence in one aspect the invention resides in a rotatable valve spool for a spool valve manifold including: a longitudinal axis along the length of the rotatable valve spool, a cylindrical body, a first end, and a second end; a first angled seal, a second angled seal, an optional central seal, and an outer seal each disposed on the cylindrical body with the optional central seal disposed between the first and second angled seals and the outer seal disposed between the second angled seal and the second end; a first flow port in the cylindrical body disposed outboard of the first angled seal between the first angled seal and the first end or disposed in the first end; and a second flow port disposed outboard of the second angled seal between the second angled seal and the outer seal.

DETAILED DESCRIPTION

Figure 1:
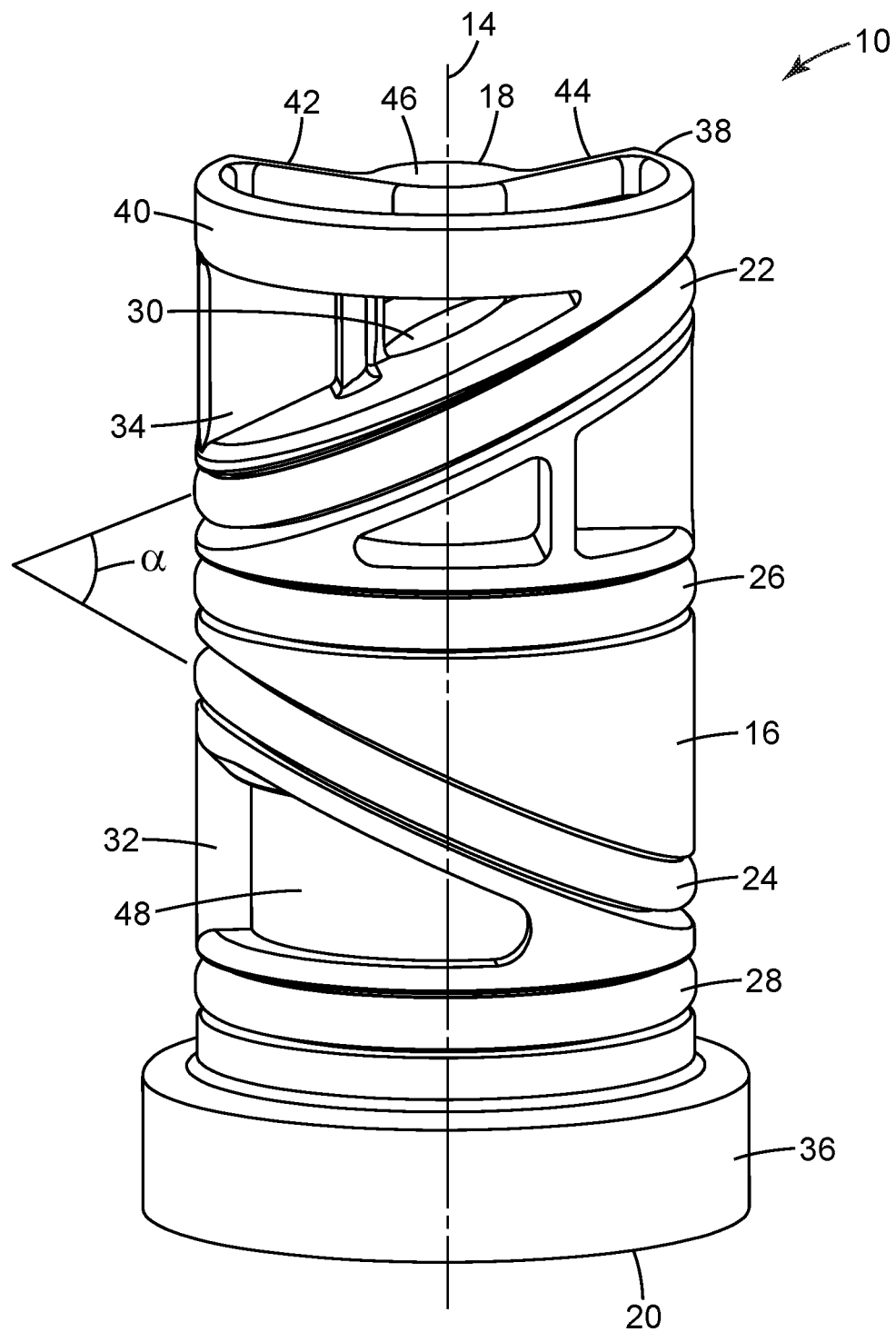
FIG. 1 illustrates a perspective view of a rotatable valve spool.

Referring now to FIGS. 1, 2, 3, and 4 a rotatable valve spool 10 for a spool valve manifold 12 is shown. The rotatable valve spool has a central longitudinal axis 14 along its length, a cylindrical body 16, a first end 18, and a second end 20. Circumferentially surrounding and disposed on the cylindrical body 16 is a first angled seal 22, a second angled seal 24, an optional central seal 26, and an outer seal 28 with the optional central seal disposed between the first and second angled seals and the outer seal disposed between the second angled seal and the second end. The optional central seal 26 and the outer seal 28 circumscribe the cylindrical body 16 substantially perpendicular to the longitudinal axis.

A first flow port 30 in the cylindrical body is disposed outboard of the first angled seal 22 between the first angled seal 22 and the first end 18 or disposed in the first end 18. A second flow port 32 is disposed outboard of the second angled seal 24 between the second angled seal 24 and the outer seal 28.

Figure 2:
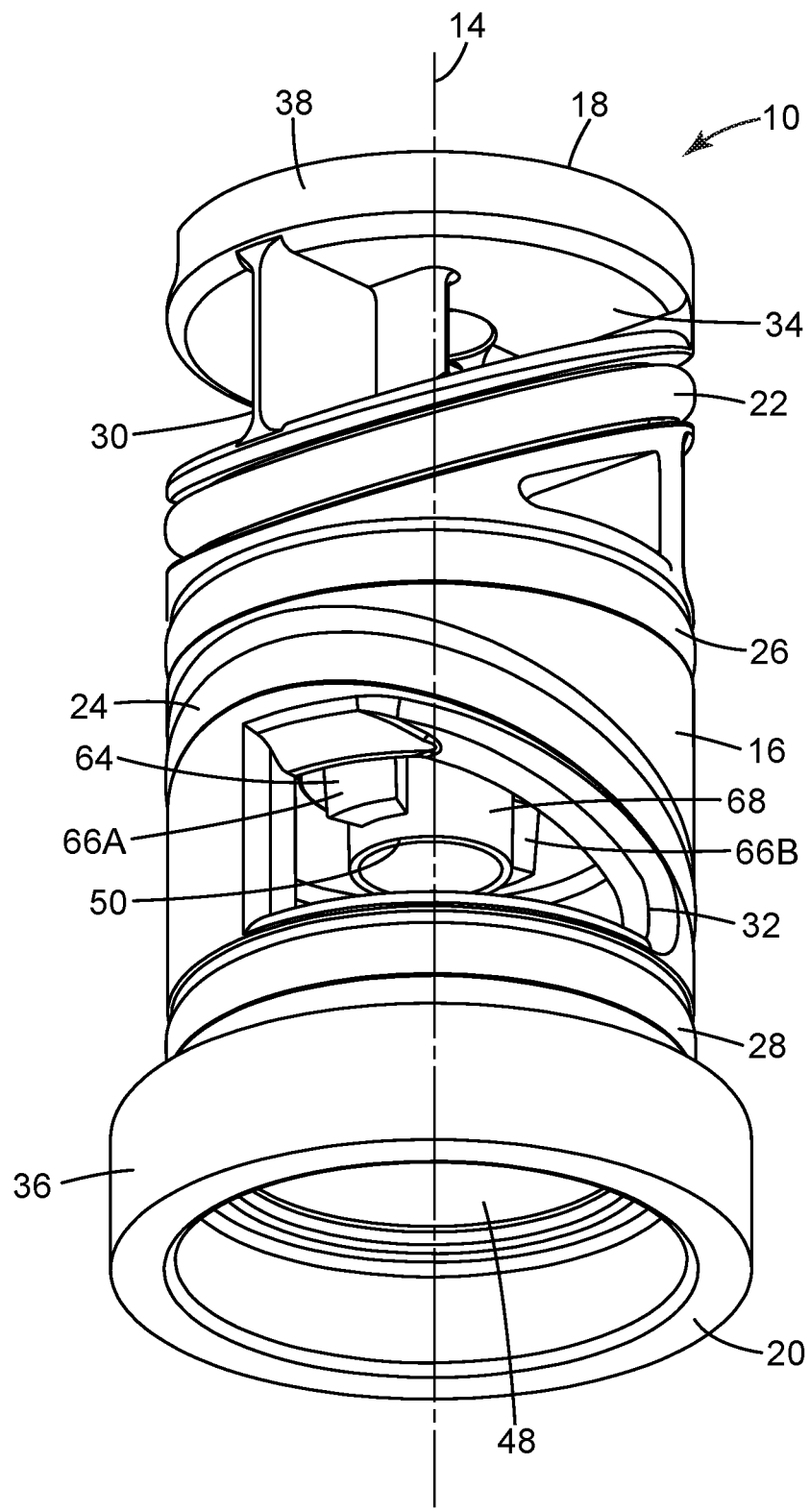
FIG. 2 illustrates another perspective view of the rotatable valve spool
Figure 4:
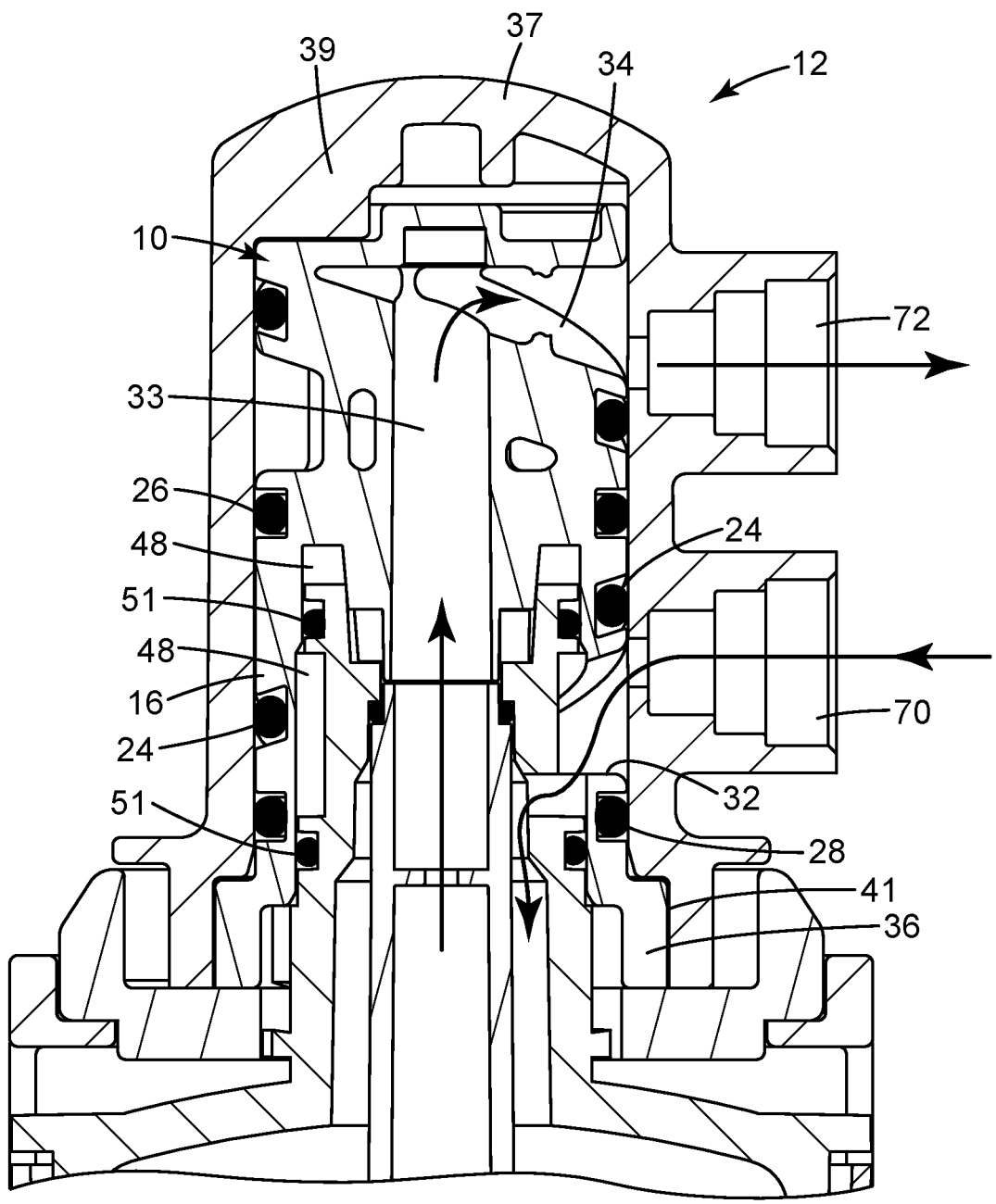
FIG. 4 illustrates a cross section of a spool valve manifold having the rotatable valve spool of FIG. 1 with the rotatable valve spool shown in the open position allowing fluid flow to the replaceable filter cartridge.

In some embodiments, the first flow port 30 is a longitudinal bore 33 through the cylindrical body 16 that could start in the first end 18. In other embodiments, the first flow port 30 is a longitudinal bore 33 through the cylindrical body 16 connected to a connecting port 34 through an outer surface of the cylindrical body 16 as shown in FIGS. 1, 2, and 4. In other embodiments, the first flow port 30 can be a recess or pathway in the outer surface of the cylindrical body 16 that allows fluid to flow through the recess to another location within the spool valve manifold or a combination of a connecting port and a recess on the outer surface.

In some embodiments, the second flow port 32 comprises a connecting port through the outer surface of the cylindrical body 16 as seen in FIGS. 1 and 2 that allows fluid to flow through the connecting port to a stem engagement bore 48 in the second end 20. In other embodiments, the second flow port 32 can be a recess or pathway in the outer surface of the cylindrical body 16 that allows fluid to flow through the recess to another location within the spool valve manifold or a combination of a connecting port and a recess on the outer surface.

Optionally, the rotatable valve spool 10 on the second end 18 includes a cylindrical ring 36 having a ring diameter greater than a body diameter of the cylindrical body 16. As best seen in FIG. 4, the cylindrical ring 36 acts as a locating bushing on the second end 20 of the rotatable valve spool 10 within a compatible housing 37 such that the depth of the rotatable valve spool within the housing is controlled to properly align the flow ports and O-ring seals within the housing. The cylindrical ring 36 butts up against a mating cylindrical cavity 41 in the housing 37 formed as a cap to position the rotatable valve spool 10 longitudinally within the housing 37 for alignment with the inlet and outlet ports of the housing.

Optionally, the rotatable valve spool on the first end 18 includes a rotation limit boss 38. In one embodiment, the rotation limit boss includes a circular wedge 40 having a first angular stop 42, a second angular stop 44, and a recessed section 46 between the first and second angular stops. The recessed section 46 and the angular stops limit the rotation of the rotatable valve spool to approximately 90 degrees when inserted into the housing 37 which has an extending boss 39 that extends into the recessed section 46 for selective engagement with the first or second angular stops (42, 44). Other rotational stops can be used such as a circumferential groove in the cylindrical body that extends for a fixed arc combined with a post in the housing that rides in the groove.

Optionally, the rotatable valve spool may have a second outer seal (not shown) substantially perpendicular to the longitudinal axis that is disposed outboard of the first angled seal 22 adjacent to the first end 18. The optional second outer seal can be positioned between the first end 18 and the first angled seal 22 such that the first flow port is positioned between the second outer seal and the first angled seal 22. The optional second outer seal is useful to isolate fluid within the manifold to the portion of the assembly between the second outer seal near the top of the rotatable valve spool and the outer seal 28 near the bottom of the rotatable valve spool. In this manner, the top of the housing 37 can be vented to atmosphere if desired unlike the manifold shown in FIG. 4 where liquid would be present in the area of the rotation limit boss 38 during use.

As best seen in FIGS. 2, 3, 4, 5, and 12 extending internally from the second end 20, the rotatable valve spool 10 includes a stem engagement bore 48 that mates with the O-rings 51 on the stem 53 of a filter cartridge 55 for a fluid tight connection. The stem engagement bore 48 is in fluid communication with the first flow port 30, which typically acts as the outlet from the filter cartridge 55 and in fluid communication with the second flow port 32, which typically acts as an inlet to the filter cartridge 55. The stem engagement bore 48 terminates in a stem engagement member 50 for engaging with a compatible valve engagement member 57 on the stem 53 of the filter cartridge 55 to rotate the rotatable valve spool 10 as the filter cartridge is rotated. The stem engagement member 50 can mate with various driving shapes for the valve engagement member 57 such as those disclosed in filed patent application Ser. No. 14/851,356 filed on Sep. 11, 2015 entitled Filter Cartridge For Translational Insertion and Rotational Engagement of a Manifold herein incorporated by reference in its entirety. FIGS. 2, 15, 27-34 and the specification at paragraphs [98]-[102], [109], and [118]-[121] of patent application Ser. No. 14/851,356 discuss various valve engagement members 57 and the proceeding matter is herein incorporated by specific reference.

FIGS. 2, 3, 5, and 12 show the stem engagement member 50. Stem engagement bore 48 receives the stem 53 extending from one end of the filter cartridge 55. The rotatable valve spool 10 (or valve body as described in patent application Ser. No. 14/851,356) is located in the housing 37 and is held between the support flange 80 and the housing during use. See FIGS. 5 and 12. The housing 37 has inlet port 70 and outlet 72 port. The rotatable valve spool 10 has the cylindrical ring 36 acting as a locating bushing that mates with housing 37. The stem engagement bore 48 terminates in the stem engagement member 50 that is engageable with, for example, the valve engagement member 57 of the filter cartridge 55.

Figure 3:
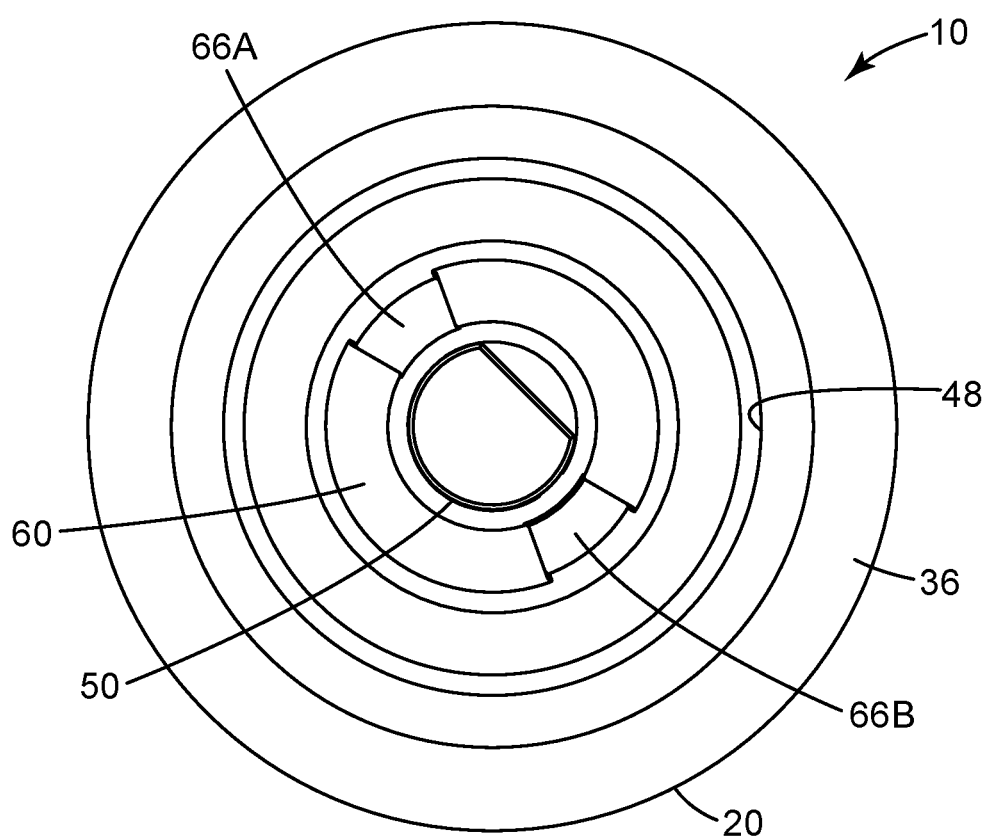
FIG. 3 illustrates a bottom view of the rotatable valve spool.
Figure 5:
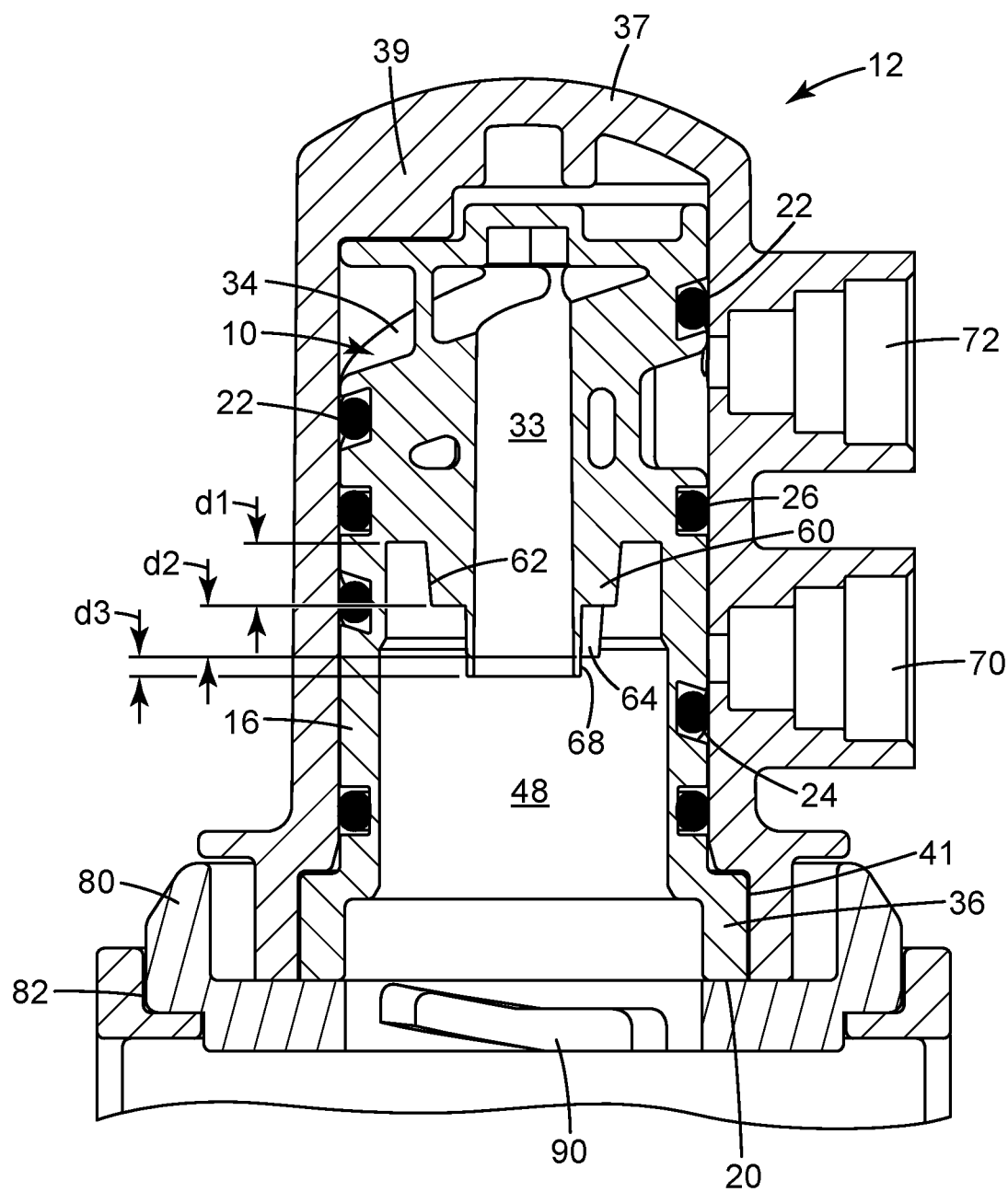
FIG. 5 illustrates a cross section of a spool valve manifold having the rotatable valve spool of FIG. 1 with the rotatable valve spool shown in the closed position not allowing fluid flow to the replaceable filter cartridge.

As best seen in FIGS. 2, 3 and 5, the stem engagement member in one embodiment is a projection comprising a tapered bushing 60 that is generally cylindrical having a slight axial taper and extending in an axial direction within the stem engagement bore 48 and having a nominal depth, d1, from the bottom surface 62 of the stem engagement bore. In this embodiment, extending from the tapered bushing 60 is the portion 64 in the form of a projection comprising features that mate with the valve engagement member. The portion 64 includes wings 66a, 66b and annulus 68 with an opening to fluidly connect the central outlet port in the filter stem to the outlet port 72 of the manifold.

Together, the wings 66a, 66b, and annulus 68 approximate a bowtie shape. The wings extend longitudinally a depth d2 from the tapered bushing 60 and annulus 60 extends longitudinally a depth of d3 from the top of the wings. This the overall length of the stem engagement feature is d1+d2+d3. The wings 66a, 66b are generally wedge-shaped, each having two flat sides that angle out from the body of the annulus 60 that are connected by an arcuate surface. The opposing flat sides of the wedge form a first drive surface and a second drive surface that are acted upon by corresponding driving surfaces in the valve engagement member 57 on the filter cartridge. Engagement of one of the driving surfaces is used for clockwise rotation (filter cartridge translates into the manifold) and engagement of the other driving surface is used for counter clockwise rotation (filter cartridge translates away from the manifold).

Thus the stem engagement member is comprised of a tapered cylindrical bushing having length of d1 with a hollow cylinder extending from its upper surface forming the annulus 60. Extending laterally on opposing sides of the annulus 60 and 180 degrees apart are the wedge shaped wings 66a, 66b that each resemble a keystone for an archway. The wedge shaped wings extend a depth of d2 from the upper surface of the tapered cylindrical bushing and the hollow cylinder or annulus extends a distance of d3 from the upper surface of the wings. Together, the wings 66a, 66b, and annulus 68 approximate a bowtie shape. Another perspective view of the stem engagement member is shown in patent application Ser. No. 14/851,356 in FIG. 49 herein specifically incorporated by reference.

In operation, the wings 66a, 66b mate with driving surfaces on the valve engagement member 57 but the engagement is intentionally loose or sloppy in that the filter cartridge 55 can be rotated in both directions a specific amount without turning the rotatable valve body 10. See patent application Ser. No. 14/851,356 FIGS. 49-59 and paragraphs [00144] to [00150] herein specifically incorporated by reference. This allows the engagement lugs 88 on the filter cartridge 55 to engage with the spool valve manifold 12 prior to turning the rotatable valve spool 10 and actuating the water supply to the filter cartridge 55.

FIGS. 6-11 provide plan views looking into the stem engagement bore 48 of alternative embodiments of rotatable valve spools having alternative stem engagement members 50 without the presence of a filter cartridge. The alternative stem engagement members 50 are suitable for use with the rotatable valve spool and manifold depicted in FIGS. 1-5 and with the rotatable valve spool and manifold depicted in FIGS. 13-15.

Figure 6:
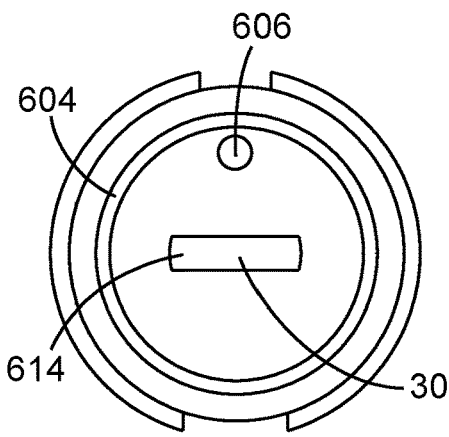
FIG. 6 illustrates a bottom view of a second embodiment of a rotatable valve spool.

In FIG. 6, the stem engagement member 614 of rotatable valve spool 604 has a length defined by two flat sides connected by slightly arcuate surfaces at each end and a width defined by a flat face that would allow it to be inserted into a valve engagement member and operate with at least a first drive surface and a second drive surface. Optional vent 606 and center point 30 are provided for perspective.

Figure 7:
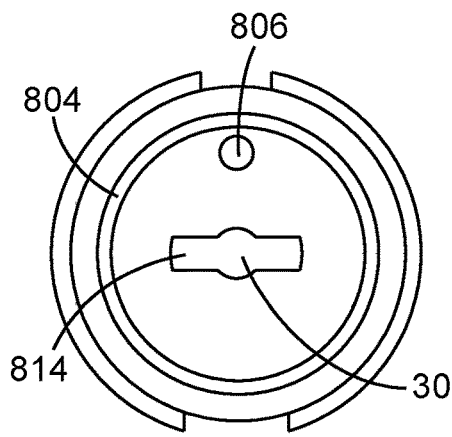
FIG. 7 illustrates a bottom view of a third embodiment of a rotatable valve spool.

The stem engagement member 814 of rotatable valve spool 804 of FIG. 7 has a length and a varying width that would allow it to be inserted into a valve engagement member and operate with at least a first drive surface and a second drive surface. The stem engagement member in this embodiment has a center bump or partial circle with two generally opposing rectangular shapes extending therefrom. Faces of the stem engagement member 614 are therefore both flat and curved. Optional vent 806 and center point 30 are provided for perspective.

Figure 8:
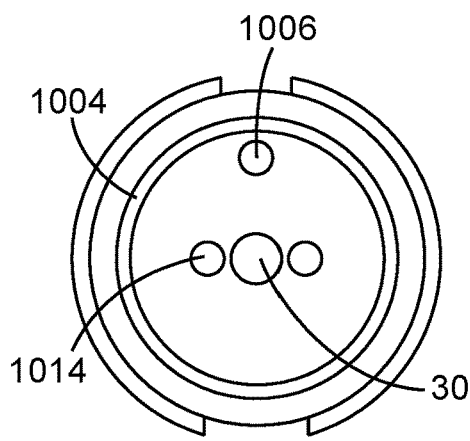
FIG. 8 illustrates a bottom view of a fourth embodiment of a rotatable valve spool.

FIG. 8 provides the stem engagement member 1014 of rotatable valve spool 1004, which has three pieces, a post of a first diameter having two posts of smaller diameter on each side, the combination of which may be inserted into a valve engagement member and operates with at least a first drive surface and a second drive surface. The posts are cylindrical, but can be of any desired cross-sectional shape, and spaced apart. Optional vent 1006 and center point 30 are provided for perspective.

Figure 9:
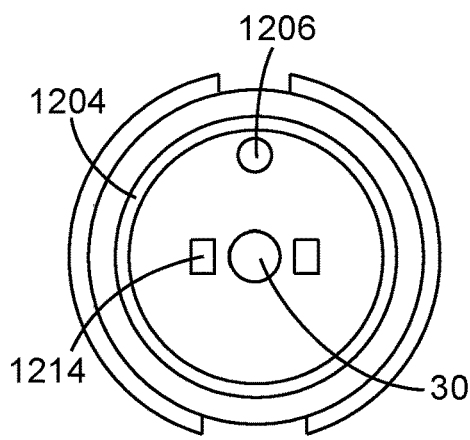
FIG. 9 illustrates a bottom view of a fifth embodiment of a rotatable valve spool.

FIG. 9 provides the stem engagement member 1214 of rotatable valve spool 1204, which has three pieces, a cylindrical post of a first diameter having two rectangular posts of smaller diameter on each side, the combination of which may be inserted into a valve engagement member and operates with at least a first drive surface and a second drive surface. The posts are spaced apart. Optional vent 1206 and center point 30 are provided for perspective.

Figure 10:
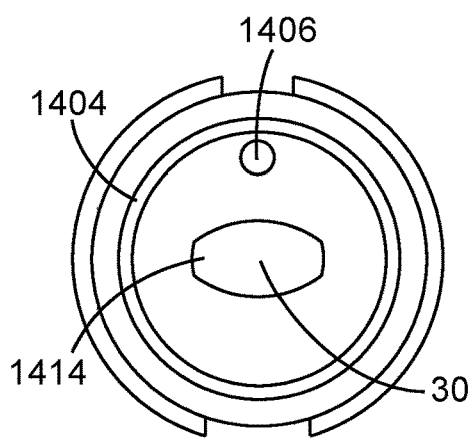
FIG. 10 illustrates a bottom view of a sixth embodiment of a rotatable valve spool.

In FIG. 10, the stem engagement member 1414 of the rotatable valve spool 1404 has a length and varying width that would allow it to be inserted into a valve engagement member and operate with at least a first drive surface and a second drive surface. The sides of the stem engagement member 1414 are two opposed concave surfaces connected by slightly arcuate surfaces at each end and connected by a flat face having a varying width. Optional vent 1406 and center point 30 are provided for perspective.

Figure 11:
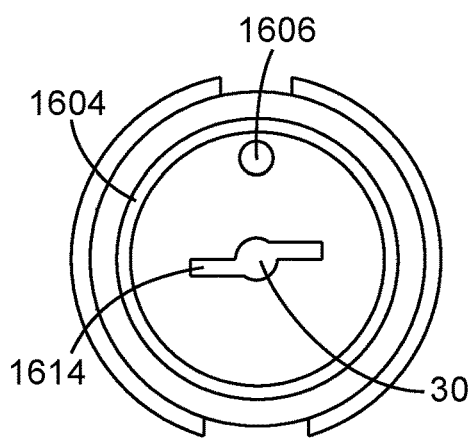
FIG. 11 illustrates a bottom view of a seventh embodiment of a rotatable valve spool.

The stem engagement member 1614 of rotatable valve spool 1604 of FIG. 11 has a center bump or partial circular section with two off-set rectangular shapes, one being in a upper position and the other being in a lower position, extending therefrom that would allow it to be inserted into a valve engagement member and operate with at least a first drive surface and a second drive surface. The faces of the projection 1614 are therefore both flat and curved. Optional vent 1606 and center point 30 are provided for perspective.

The stem engagement members of FIGS. 6-10 are projections extending longitudinally from the bottom surface of the stem engagement bore 48. However, alternatively, they could be recesses or apertures in the bottom surface of the stem engagement bore 48 and the filter cartridge stem could have corresponding projections to mate with the recesses.

Referring now to FIGS. 4 and 5, the position of the rotatable valve spool 10 between an "open" and a "closed" position is shown in cross section. As seen in FIG. 4 in the "open" position, liquid from the inlet port 70 of the housing 37 flows though the inlet port and is isolated within the housing between the second angled seal 24 and the outer seal 28. The liquid flows through the second flow port 32 through the sidewall of the cylindrical body 16 and into the inlet port on the side of the stem 53 of filter cartridge 55 where it is further directed internally into the body of the filter cartridge. After passing through a filter such as a carbon block in the body, the liquid returns to the stem though an outlet bore of the stem and into the longitudinal bore 33 of the rotatable valve spool, exits through the first connecting port 34, and then out the outlet port 72 in the housing 37.

Referring now to FIG. 5 the rotatable valve spool 10 is shown in the "closed" position and the filter cartridge 55 has been withdrawn from the spool valve manifold 12. As seen, the fluid from the inlet port 70 is isolated to an area of the rotatable valve spool 10 between the optional central seal 26 and the second angled seal 24. Since there is not a corresponding flow port or connecting recess in this portion of the rotatable valve spool the fluid is dead headed against the outer surface of the cylindrical body 16 between these two seals. Similarly, the fluid from the outlet port 72 is isolated to an area of the rotatable valve spool 10 between the optional central seal 26 and the first angled seal 22. Since there is not a corresponding flow port or connecting recess in this portion of the rotatable valve spool 10 the fluid is dead headed against the outer surface of the cylindrical portion 16 of the rotatable valve spool between these two seals. Note that the recesses shown in the cylindrical body 16 in the vicinity of the outlet port 72 in FIG. 5 do not connect or allow fluid to flow through the rotatable valve spool and are provided for the purpose of improving moldability of the part. In this embodiment, the optional central seal 26 is present and useful to prevent bypass of the fluid from the inlet port 70 to the outlet port 72 of the housing 37 when the rotatable valve spool is in the "closed" position. A manifold with this design requires a filter cartridge to be inserted and the rotatable valve spool to be in the "open" position in order to obtain liquid downstream of the manifold.

In an alternative embodiment of the spool valve manifold 12, the optional central seal 26 is removed or not provided. In this embodiment, when the rotatable valve spool 10 is in the "closed" position as shown in FIG. 5 the inlet 70 and outlet 72 ports of the spool valve manifold 12 are in fluid communication and fluid can pass from the inlet port to the outlet port in a bypass mode. A bypass mode is useful for applications where it is desired to obtain fluid downstream of the manifold regardless of whether a filter cartridge is installed or not. To further enhance the bypass mode, a shallow recess or connecting port can be provided in the cylindrical body 16 of the rotatable valve spool 10 extending longitudinally from the inlet port 70 to the outlet port 72.

Figure 13:
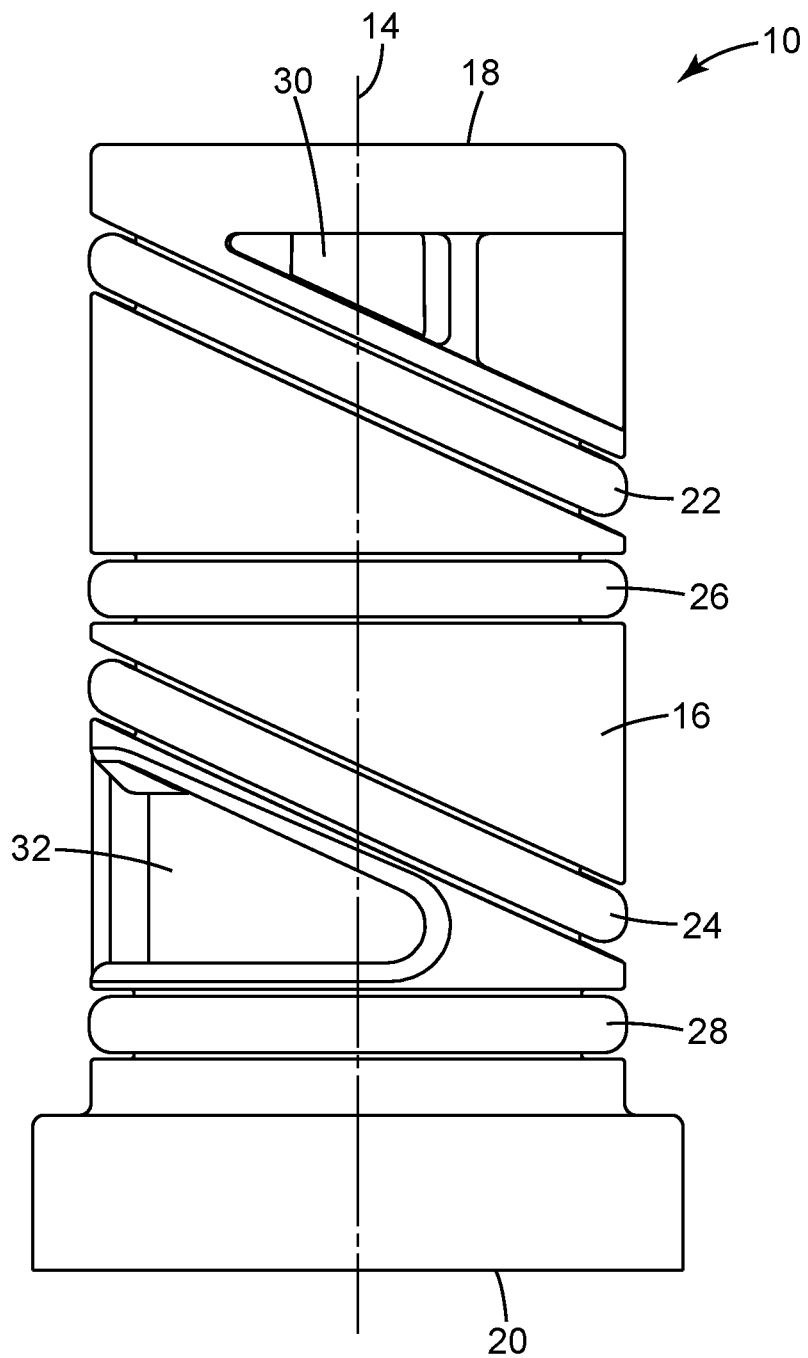
FIG. 13 illustrates a perspective view of an eighth embodiment of a rotatable valve spool.
Figure 14:
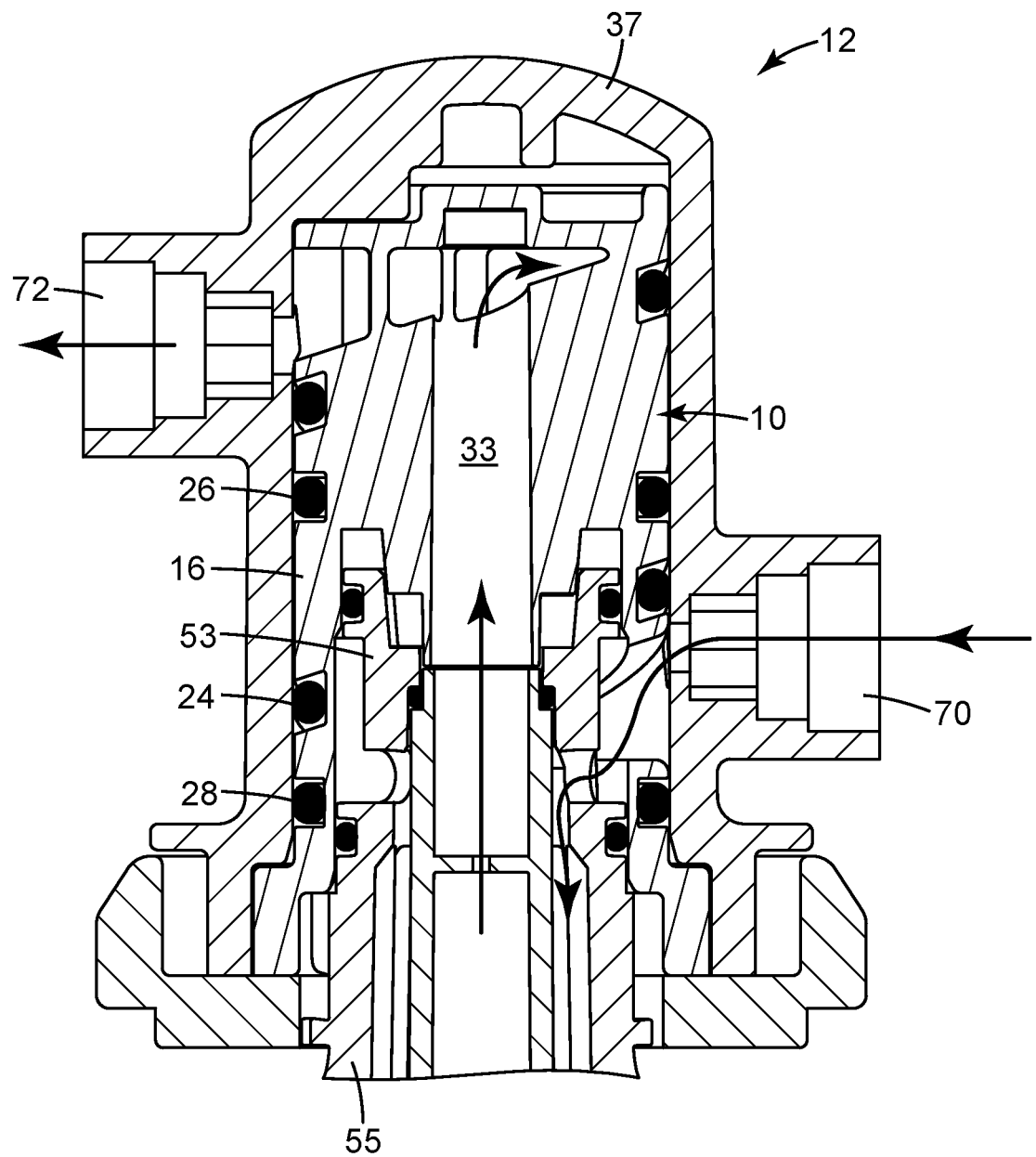
FIG. 14 illustrates a cross section of a spool valve manifold having the rotatable valve spool of FIG. 13 with the rotatable valve spool shown in the open position allowing fluid flow to the replaceable filter cartridge.
Figure 15:
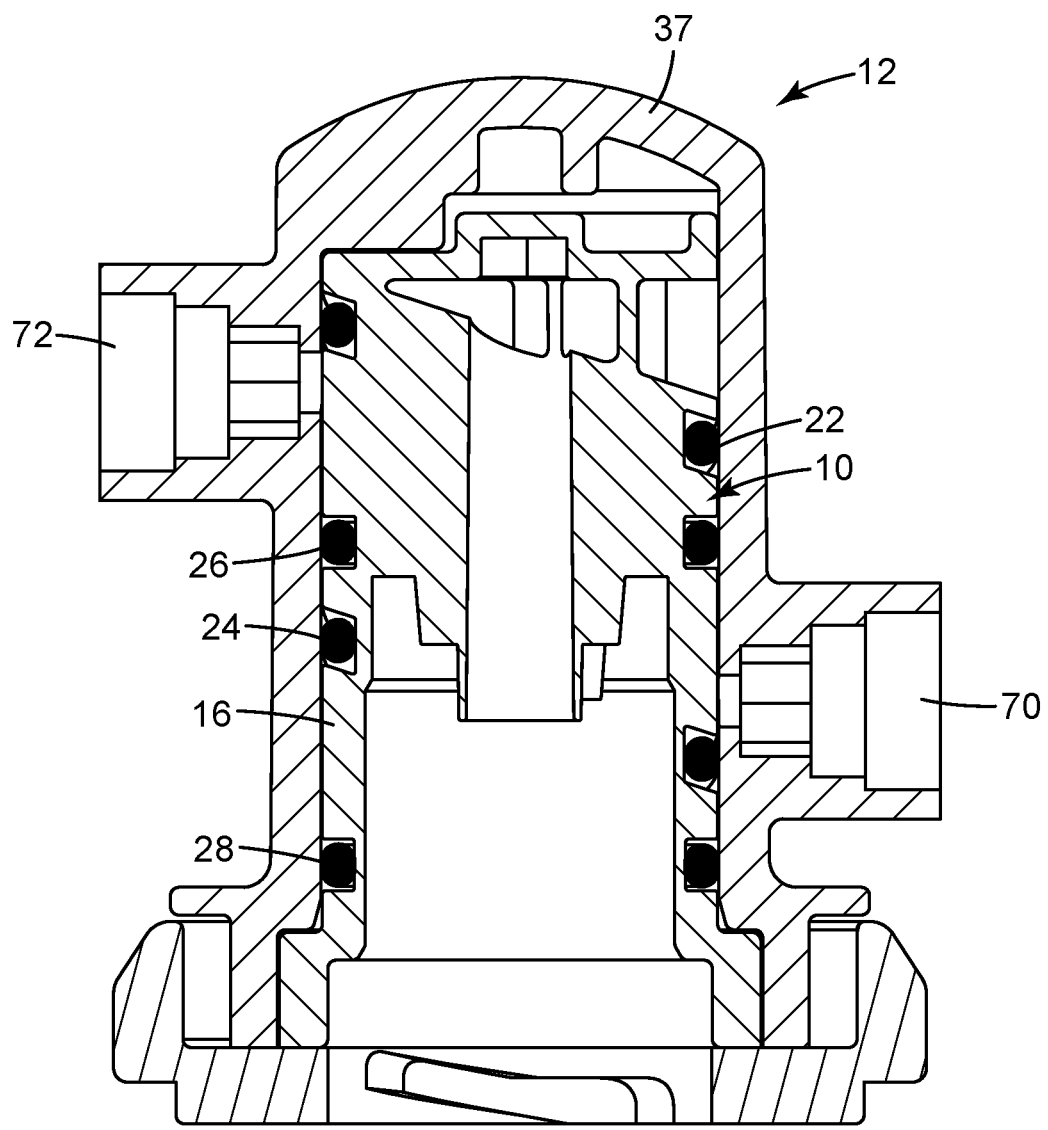
FIG. 15 illustrates a cross section of a spool valve manifold having the rotatable valve spool of FIG. 13 with the rotatable valve spool shown in the closed position not allowing fluid flow to the replaceable filter cartridge.

Depending on the location of the inlet and outlet ports (70, 72) on the housing 37, the orientation of the first and second angled seals (22, 24) can be adjusted. In some embodiments, the first angled seal and the second angled seal are not parallel to each other. In other embodiments, the first and second angled seals are parallel to each other as shown in FIGS. 13-15. In some embodiments, the first angled seal 22 and the second angle seal 24 are both closer to the optional central seal 26 on a first side of the cylindrical portion 16 and are both farther away from the central seal on a second opposing side of the cylindrical portion as seen in FIG. 1. In yet further embodiments, the first angled seal 22 and the second angle seal 26 form an included angle α between the centerlines of each seal and the included angle α is between about 20 degrees to about 80 degrees, or between about 30 degrees to about 70 degrees, or between about 40 degrees to about 60 degrees. In one embodiment, the included angle α was approximately 50 degrees. For filter cartridges that engage with slightly less rotation a greater included angle α can be used to sweep the necessary liner translation of the angled seals as they are rotated to open and close the inlet and outlet ports, and for filter cartridges that engage with more angular rotation such as 180 degrees or even 270 degrees, a lesser included angle α can be used to sweep the necessary linear translation of the angled seals to open and close the inlet and outlet ports.

Figure 12:
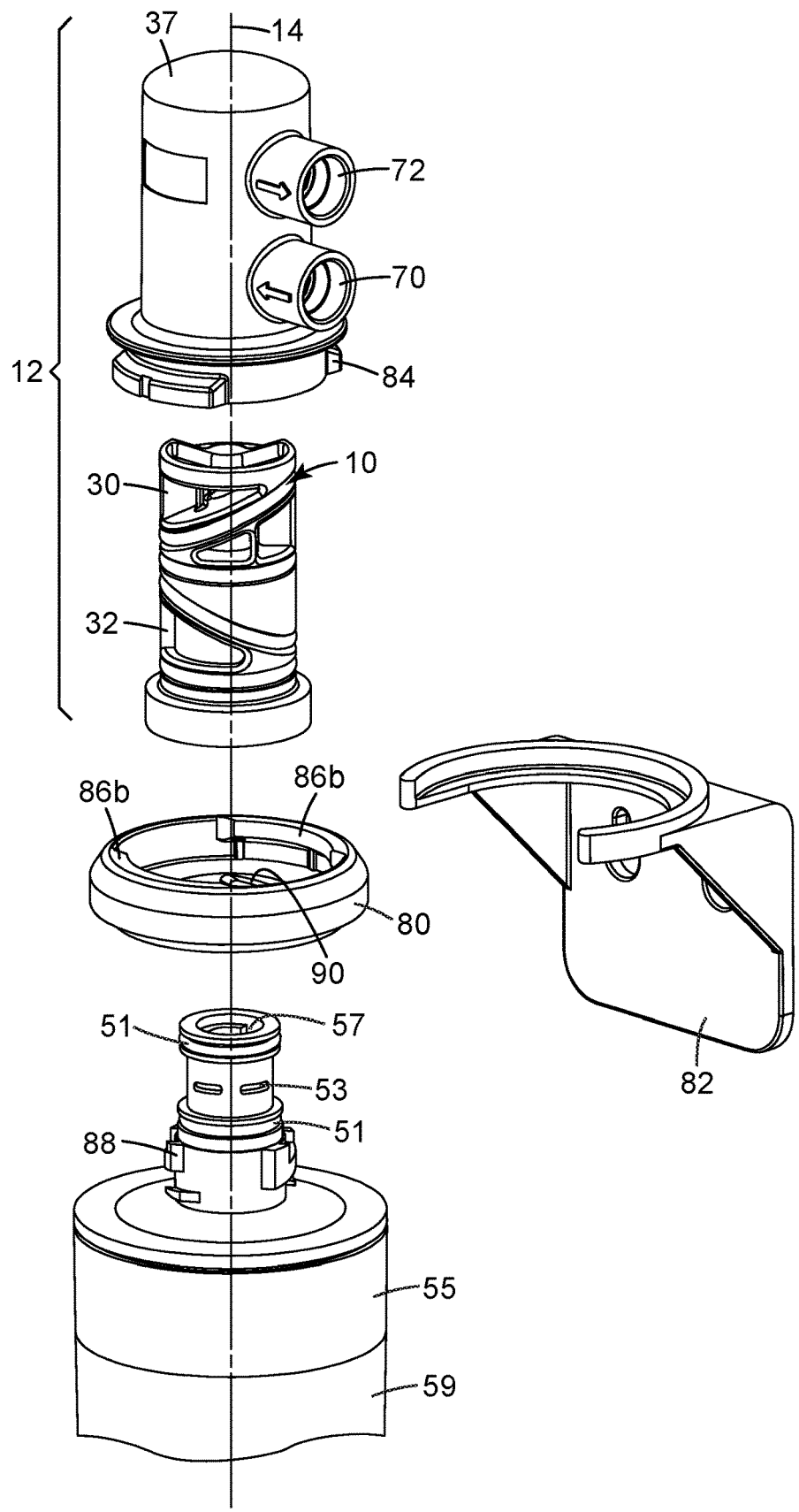
FIG. 12 illustrates an assembly view of the spool valve manifold and a replaceable filter cartridge.

FIG. 12 provides an exploded perspective view of the spool valve manifold 12 and filter cartridge 55 in accordance with an embodiment. Spool valve manifold 12 comprises the housing 37 for the rotatable valve spool 10 and a support flange 80, which may optionally have a mounting bracket 82. Spool valve manifold 12 is designed to be part of a fluid filtration system to which water would be supplied. The housing 37 comprises one or more tabs 84 that are engageable upon rotation with retention ribs 86a and 86b of the support flange 80. The tabs 84 project radially outwardly from the lower region of housing 37. Upon assembly of the rotatable valve spool 10, the housing 37, and the support flange 80; the first and second flow ports (30, 32), which are openings from an outer surface through the sidewall to an inner surface of the rotatable valve spool 10, are in fluid communication with the inlet and outlet ports of the housing (70, 72), which are flow passages from an outer surface though the sidewall to an inner surface of the housing 37. The first and second flow ports (30, 32) are not in fluid communication with the inlet and outlet ports 70, 72 when the rotatable valve spool is in the "closed" position and the inlet and outlet ports 70, 72 are blocked by the outer surface of the rotatable valve spool 10 or allowed to be in a "bypass" mode with the optional central seal 26 removed or not provided.

Filter cartridge 55 comprises a cartridge body 59, which is often generally cylindrical in shape and has the stem 53 extending from one end of the cartridge body 59. The stem 53 has a diameter that is less than the diameter of the cartridge body 59. Central longitudinal axis 14 is shown lengthwise down the centers of the spool valve manifold 12 and the filter cartridge 55. The stem 53 has an inlet opening in the sidewall of the stem and a stem face on the end where an outlet opening is through the stem face. The distal end of the stem comprises the valve engagement member 57 which in one embodiment is located below the stem face in an aperture or recess. The filter cartridge 55 comprises lugs 88 extending radially from the stem 53 and the lugs engage with corresponding internal circumferential cams 90 positioned within the support flange 80. The lugs 88 engage with the internal circumferential cams 90 on the support flange 80 as the filter cartridge is rotated advancing the filter cartridge into the spool valve manifold thereby engaging valve engagement member 57 with the stem engagement member 50 located in the stem engagement bore 48 of the rotatable valve spool 10 and rotating it to turn on the flow of water though the filter.

The housing 37 acts as a cap over the top of the rotatable valve spool 10. In one embodiment, the inlet port 70 and the outlet port 72 are vertically stacked with their centers located in the same plane, separated by a nominal distance between the centers, and located on the same side of the housing to facilitate easier routing of the supply tubing to the manifold. In other embodiments, the inlet and outlet ports are placed at other circumferential positions about the housing and at other elevations such as seen in FIGS. 14 and 15 where the inlet and outlet ports are on opposing sides of the housing 37.

Referring now to FIGS. 13-15 another embodiment for the rotatable valve spool 10 and manifold 12 is shown. The rotatable valve spool has a longitudinal axis 14 along its length, a cylindrical body 16, a first end 18, and a second end 20. Circumferentially surrounding and disposed on the cylindrical body 16 is a first angled seal 22, a second angled seal 24, an optional central seal 26, and an outer seal 28 with the optional central seal disposed between the first and second angled seals and the outer seal disposed between the second angled seal and the second end. The optional central seal 26 and the outer seal 28 circumscribe the cylindrical body 16 substantially perpendicular to the longitudinal axis.

A first flow port 30 in the cylindrical body is disposed outboard of the first angled seal 22 between the first angled seal 22 and the first end 18 or disposed in the first end 18. A second flow port 32 is disposed outboard of the second angled seal 24 between the second angled seal 24 and the outer seal 28.

The remaining features of the rotatable spool valve 10 are the same as the features and optional features for the embodiment described and depicted in FIGS. 1-3. As seen in FIG. 13, the first angled seal 22 and second angled seal 26 are substantially parallel to each other whereas in the embodiment shown in FIG. 1, the first angled seal 22 and the second angled seal 26 are non-parallel to each other.

Referring now to FIGS. 14 and 15, the position of the rotatable valve spool 10 of FIG. 13 between an "open" and a "closed" position is shown in cross section. As seen in FIG. 14 in the "open" position, liquid from the inlet port 70 of the housing 37 flows though the inlet port and is isolated within the housing between the second angled seal 24 and the outer seal 28. The liquid flows through the second flow port 32 through the sidewall of the cylindrical body 16 and into the inlet port on the side of the stem 53 of filter cartridge 55 where it is further directed internally into the body of the filter cartridge. After passing through a filter such as a carbon block in the body, the liquid returns to the stem though an outlet bore of the stem and into the longitudinal bore 33 of the rotatable valve spool, exits through the first connecting port 34, and then out the outlet port 72 in the housing 37.

Referring now to FIG. 15 the rotatable valve spool 10 is shown in the "closed" position and the filter cartridge 55 has been withdrawn from the spool valve manifold 12. As seen, the fluid from the inlet port 70 is isolated to an area of the rotatable valve spool 10 between the optional central seal 26 and the second angled seal 24. Since there is not a corresponding flow port or connecting recess in this portion of the rotatable valve spool the fluid is dead headed against the outer surface of the cylindrical body 16 between these two seals. Similarly, the fluid from the outlet port 72 is isolated to an area of the rotatable valve spool 10 between the optional central seal 26 and the first angled seal 22. Since there is not a corresponding flow port or connecting recess in this portion of the rotatable valve spool 10 the fluid is dead headed against the outer surface of the cylindrical portion 16 of the rotatable valve spool between these two seals. In this embodiment, the optional central seal 26 is present and useful to prevent bypass of the fluid from the inlet port 70 to the outlet port 72 of the housing 37 when the rotatable valve spool is in the "closed" position. A manifold with this design requires a filter cartridge to be inserted and the rotatable valve spool to be in the "open" position in order to obtain liquid downstream of the manifold.

In an alternative embodiment of the spool valve manifold 12, the optional central seal 26 is removed or not provided. In this embodiment, when the rotatable valve spool 10 is in the "closed" position as shown in FIG. 15 the inlet 70 and outlet 72 ports of the spool valve manifold 12 are in fluid communication and fluid can pass from the inlet port to the outlet port in a bypass mode. A bypass mode is useful for applications where it is desired to obtain fluid downstream of the manifold regardless of whether a filter cartridge is installed or not. To further enhance the bypass mode, a shallow recess or connecting port can be provided in the cylindrical body 16 of the rotatable valve spool 10 extending from the inlet port 70 to the outlet port 72 around the periphery of the cylindrical body.

Suitable seals on the rotatable valve spool 10 include grooves formed into the circumference of the cylindrical portion 16 with an O-ring disposed into each groove. Alternatively, the seals on the rotatable valve spool 10 can be a close tolerance of a finished surface that mates with a suitable O-ring that is disposed into a grove on the inner bore of the housing 37. Or some of the O-rings can be placed on the rotatable valve spool 10 and some of the O-rings can be placed into the inner bore of the housing 37. Alternative seals can be used such as a land and a bore with a close tolerance.

Suitable materials for forming the rotatable valve spool, cap and flange include thermoplastics and metallic materials. Suitable materials for the O-rings include elastomeric materials.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A rotatable valve spool for a spool valve manifold comprising:
    a longitudinal axis along the length of the rotatable valve spool, a cylindrical body, a first end, and a second end;
    a first angled seal, a second angled seal, and an outer seal each disposed on the cylindrical body with the outer seal disposed between the second angled seal and the second end;
    a first flow port in the cylindrical body disposed between the first angled seal and the first end or disposed in the first end; wherein the first flow port comprises a longitudinal bore through the cylindrical body;
    a second flow port disposed between the second angled seal and the outer seal; and wherein the second flow port comprises a connecting port through an outer surface of the cylindrical body that allows a fluid to flow through the connecting port to a stem engagement bore in the second end.

2. The rotatable valve spool of claim 1 wherein the first flow port comprises a connecting port through an outer surface of the cylindrical body and the longitudinal bore through the cylindrical body.

3. The rotatable valve spool of claim 1 wherein the second end comprises a cylindrical ring having a ring diameter greater than a body diameter of the cylindrical body.

4. The rotatable valve spool of claim 1, wherein the first end comprises a rotation limit boss.

5. The rotatable valve spool of claim 4 wherein the rotation limit boss comprises a circular wedge having a first angular stop, a second angular stop, and a recessed section between the first and second angular stops.

6. The rotatable valve spool of claim 1 wherein the stem engagement bore comprises a stem engagement member.

7. The rotatable valve spool of claim 6 wherein the stem engagement member comprises a tapered cylindrical bushing having a length of d1 with a hollow cylinder extending from an upper surface forming an annulus; extending laterally on opposing sides of the annulus are two wedge shaped wings that each resemble a keystone for an archway; the wedge shaped wings extend a depth of d2 from the upper surface of the tapered cylindrical bushing and the annulus extends a distance of d3 from an upper surface of the wedge shaped wings.

8. The rotatable valve spool of claim 1 wherein the first angled seal and the second angled seal are parallel to each other.

9. The rotatable valve spool of claim 1 wherein a central seal is disposed between the first and second angled seals, and the first angled seal and the second angle seal are both closer to the central seal on a first side of the cylindrical body and are both farther away from the central seal on an opposing second side of the cylindrical body.

10. The rotatable valve spool of claim 1 wherein the first angled seal and the second angle seal form an included angle and the included angle is between 20 degrees to 80 degrees.

11. The rotatable valve spool of claim 1 wherein a central seal is disposed between the first and second angled seals, and the central seal is effective to prevent fluid bypass from an inlet port to an outlet port on a spool valve manifold containing the rotatable valve spool when the rotatable valve spool is in a closed position.

12. The rotatable valve spool of claim 1 wherein a central seal is not present and fluid can pass from an inlet port to an outlet port on a spool valve manifold containing the rotatable valve spool when the rotatable valve spool is in a closed position.

13. The rotatable valve spool of claim 1 further comprising a housing and a support flange with the rotatable spool valve inserted into the housing above the support flange.

14. The rotatable valve spool of claim 13 wherein the second end comprises a cylindrical ring having a ring diameter greater than a body diameter of the cylindrical body.

15. The rotatable valve spool of claim 13 wherein the first end comprises a rotation limit boss and the rotation limit boss comprises a circular wedge having a first angular stop, a second angular stop, and a recessed section between the first and second angular stops.

16. The rotatable valve spool of claim 13 wherein the housing comprises an inlet port and an outlet port that are vertically stacked with their centers located in the same plane, the centers separated by a distance, and the inlet port and the outlet port are located on the same side of the housing.

17. The rotatable valve spool of claim 13 wherein the housing comprises an inlet port and an outlet port and the inlet port and the outlet port are located on opposite sides of the housing.

18. The rotatable valve spool of claim 1 wherein the stem engagement bore comprises a stem engagement member.

19. The rotatable valve spool of claim 18 wherein the stem engagement member comprises a tapered cylindrical bushing having a length of d1 with a hollow cylinder extending from an upper surface forming an annulus; extending laterally on opposing sides of the annulus are two wedge shaped wings that each resemble a keystone for an archway; the wedge shaped wings extend a depth of d2 from the upper surface of the tapered cylindrical bushing and the annulus extends a distance of d3 from an upper surface of the wedge shaped wings.

* * * * *